US012524046B2

(12) United States Patent
Sanchez et al.

(10) Patent No.: US 12,524,046 B2
(45) Date of Patent: Jan. 13, 2026

(54) MODULAR PORTABLE INFORMATION HANDLING SYSTEM HINGE WITH SELECTIVELY DISENGAGED ROTATION STOP

(71) Applicant: Dell Products L.P., Round Rock, TX (US)

(72) Inventors: Anthony J. Sanchez, Pflugerville, TX (US); John Trevor Morrison, Round Rock, TX (US); Jace W. Files, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 182 days.

(21) Appl. No.: 18/376,593

(22) Filed: Oct. 4, 2023

(65) Prior Publication Data

US 2025/0117050 A1 Apr. 10, 2025

(51) Int. Cl.
*G06F 1/16* (2006.01)
(52) U.S. Cl.
CPC .......... *G06F 1/1681* (2013.01); *G06F 1/1616* (2013.01)
(58) Field of Classification Search
CPC .............................. G06F 1/1681; G06F 1/1616
USPC ..................................................... 361/679.27
See application file for complete search history.

(56) References Cited

U.S. PATENT DOCUMENTS

| 5,666,694 | A | * | 9/1997 | Slow ...................... G06F 1/1618 16/342 |
| 5,860,015 | A | | 1/1999 | Olson |
| 5,966,284 | A | | 10/1999 | Youn et al. |
| 6,449,142 | B1 | | 9/2002 | Wu |
| 8,422,212 | B2 | | 4/2013 | Liu et al. |
| 8,634,873 | B2 | | 1/2014 | Jones et al. |
| 8,917,501 | B2 | | 12/2014 | Hokugou et al. |
| 9,274,565 | B2 | | 3/2016 | Tanaka |
| 9,494,976 | B2 | | 11/2016 | Bates et al. |
| 9,507,385 | B2 | | 11/2016 | Chen et al. |
| 2004/0012509 | A1 | | 1/2004 | Chen |
| 2004/0190239 | A1 | | 9/2004 | Weng et al. |
| 2005/0184970 | A1 | | 8/2005 | Wegert et al. |
| 2008/0019085 | A1 | | 1/2008 | Nakajima |
| 2008/0174458 | A1 | | 7/2008 | Mundt et al. |
| 2010/0092196 | A1 | | 4/2010 | Mimura |

(Continued)

OTHER PUBLICATIONS

U.S. Appl. No. 18/081,061, filed Dec. 14, 2022, entitled "Information Handling System Keyboard Support With Rail Guide Structure Assembly to a Housing Rail," by inventors John Trevor Morrison et al.

*Primary Examiner* — Hung S. Bui
(74) *Attorney, Agent, or Firm* — Zagorin Cave LLP; Robert W. Holland

(57) ABSTRACT

An information handling system hinge has a modular and selectively separable core that couples to hinge mounts in an interchangeable manner so that core selection defines hinge characteristics, such as torque, detent orientation and stop orientation. A standardized mount accepts cores with different rotational characteristics for streamlined manufacture of information handling systems and improved reuse and recycling of hinge components. A stop included with the hinge limits hinge rotation to a defined orientation, such as 135 degrees, and is released by engagement with a tool form exterior the housing to allow rotation past the defined orientation and thereby release a display from the housing.

20 Claims, 15 Drawing Sheets

(56) References Cited

U.S. PATENT DOCUMENTS

| | | |
|---|---|---|
| 2010/0149741 A1 | 6/2010 | Liu |
| 2010/0300159 A1 | 12/2010 | Berg et al. |
| 2012/0102675 A1* | 5/2012 | Lee ..................... G06F 1/1681 16/243 |
| 2013/0135809 A1* | 5/2013 | Uchiyama ............ G06F 1/1681 16/371 |
| 2013/0222993 A1 | 8/2013 | Iizuka |
| 2013/0286561 A1 | 10/2013 | Hokugou et al. |
| 2013/0308261 A1 | 11/2013 | Matsumoto et al. |
| 2013/0318746 A1* | 12/2013 | Kuramochi ........... G06F 1/1681 16/371 |
| 2014/0204519 A1 | 7/2014 | Wu |
| 2014/0204520 A1 | 7/2014 | Wu et al. |
| 2014/0355193 A1 | 12/2014 | Purcocks |
| 2015/0189962 A1 | 7/2015 | Yeo et al. |
| 2016/0011627 A1 | 1/2016 | Lin |
| 2016/0231788 A1 | 8/2016 | Chen et al. |
| 2019/0302852 A1 | 10/2019 | Kitamura et al. |
| 2020/0333852 A1 | 10/2020 | Smith et al. |
| 2020/0348745 A1 | 11/2020 | Hamlin et al. |
| 2021/0223825 A1 | 7/2021 | Seiler et al. |
| 2022/0214720 A1* | 7/2022 | Morrison ........... H01H 13/7065 |
| 2023/0185291 A1 | 6/2023 | Morrison et al. |

* cited by examiner

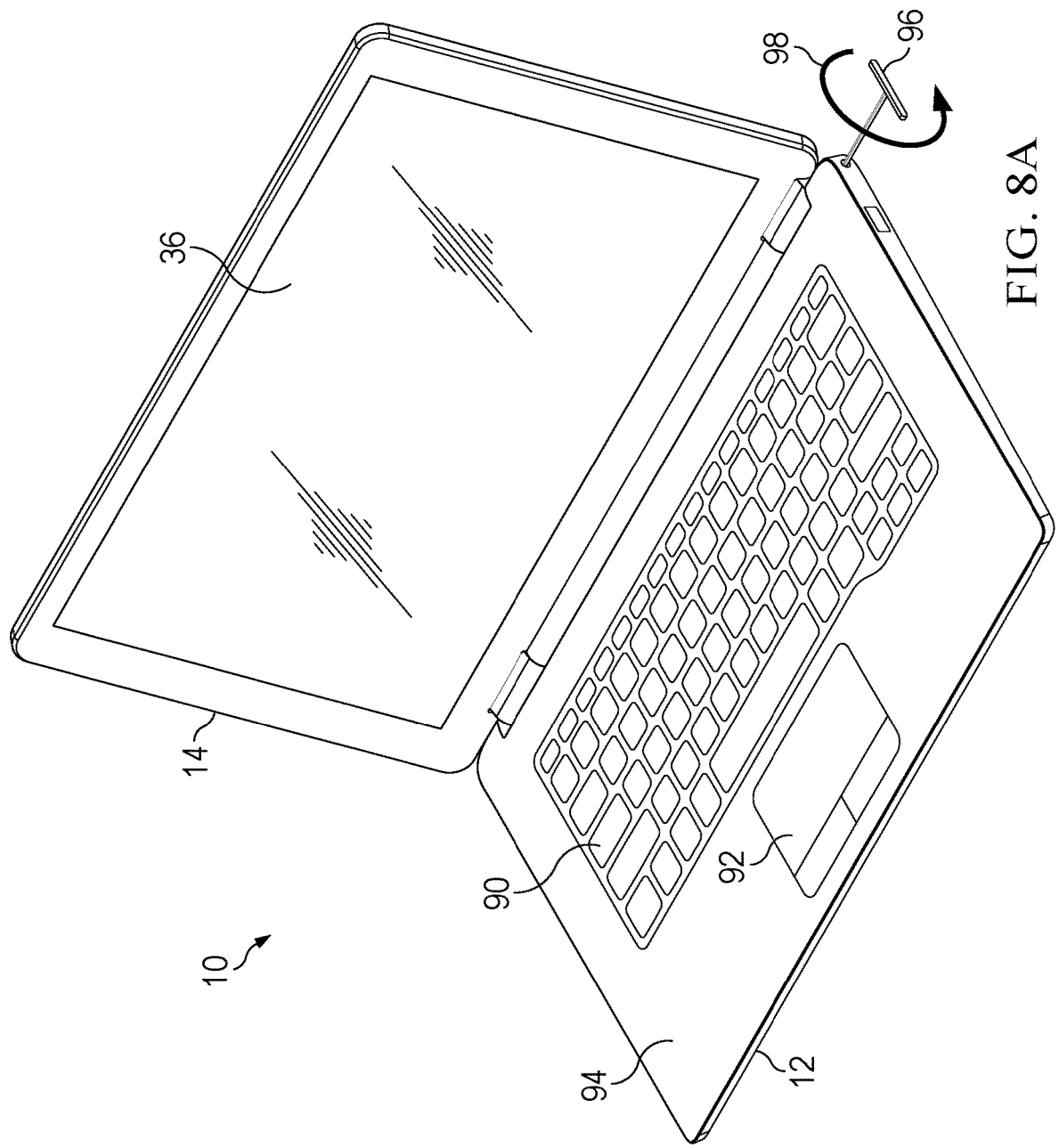

MODULAR PORTABLE INFORMATION HANDLING SYSTEM HINGE WITH SELECTIVELY DISENGAGED ROTATION STOP

BACKGROUND OF THE INVENTION

Field of the Invention

The present invention relates in general to the field of portable information handling systems, and more particularly to a modular portable information handling system hinge with selectively disengaged rotation stop.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

Information handling systems generally have a stationary or portable configuration. Stationary configurations include desktop and server systems that typically operate in a fixed location with external power and peripherals. Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility. Portable information handling systems also operate with peripheral devices, particularly when the end user is in an office or home environment.

Recently, increased reliance on work from home and improvements in processing, storage and networking capabilities for portable information handling systems have resulted in a greater use of portable information systems for personal and enterprise usage scenarios. Mobile use scenarios can result in greater wear and tear on portable information handling systems with large variances in expected life depending on how and where the systems are used. In some situations, batteries, displays and keyboards integrated in portable information handling systems experience little use, such as when the systems are used with a dock and external peripherals, while in other situations these components are used extensively, such as when the systems are used in mobile scenarios. When a portable information handling system fails due to a component failure, many of the remaining components have substantial useable life. Repairing a portable information handling system by replacing failed components helps to reduce commitment of functional components to landfills, to reduce system costs and to reduce environmental impacts. In some instances, the remaining components have experienced variable use so that the remaining life of the repaired system is uncertain and repairing with new components can be inefficient and cost prohibitive. An alternative is to harvest components from a failed information handling system, test the components for remaining life, and then reuse components where justified. Unfortunately, the expense of breaking down information handling systems, testing the components and rebuilding the information handling systems can often prove prohibitive.

One difficulty with reuse of information handling system components is the tracking of remaining life and predicting of future failures. Another difficulty is tearing down the information handling systems to separate out reusable components and then reassembling the components into refurbished or repaired information handling systems. Although reuse of components seems environmentally friendly on a superficial level, the true environmental cost can include a variety of factors related to the manufacture of the components, operational management of manufacturing activities and transportation logistics. One component that tends to wear in portable information handling systems is the hinge that rotationally couples the main housing portion to the lid housing portion. Over time, rotation of the housing portions can wear out the torque engine and other friction parts that help to rotate the housing in an expected manner. Although hinge movement can be tracked to estimate remaining hinge life, the actual wear cannot be readily evaluated without breaking down the information handling system. Even when a given hinge has life remaining, the hinge must match the type of hinge and torque specifications of a replacement housing, which can vary depending upon the system weight and components. Further, removal of a hinge from a deployed system typically involves removal of screws that take time to access and unscrew. In some instances, a hinge with remaining life can remain in the same housing but must nonetheless be removed to breakdown other components, such as in systems that have to remove the hinge to access a display panel in a lid housing portion and/or a keyboard in a main housing portion. In some instances, the cost of breaking down a hinge to access a keyboard can prove prohibitive so that evaluation of the keyboard for reuse is not performed as uneconomical.

SUMMARY OF THE INVENTION

Therefore, a need has arisen for a system and method which supports reuse of information handling system hinge components.

A further need exists for a system and method of coupling and removing a hinge at an information handling system in an automated manner.

A further need exists for a hinge stop assembly that is selectively disabled to rotate an information handling system housing to support disassembly.

In accordance with the present invention, a system and method are provided which substantially reduce the disadvantages and problems associated with previous methods and systems for rotationally coupling information handling system housing portions. A portable information handling system modular hinge rotationally couples lid and main housing portions with a mount coupled to each housing portion and a separable hinge core with selectable rotational characteristics that couples to each mount. The mount couples to the housing portion with a wire bale that latches in place with a central part of the wire bundle under the hinge mount. When the hinge characteristics includes a hinge stop orientation, the hinge stop is selectively removed to allow greater rotation of the housing portions to access a display and/or keyboard for removal from the information handling system.

More specifically, a portable information handling system processes information with a processor and memory coupled in a portable housing and interfaced with an integrated display. The portable housing has a main portion that holds the processor and memory and a lid portion that holds the display. The main and lid portions rotationally couple with a modular hinge having a hinge mount coupled to each portion and a hinge core that supports rotation with selectable rotational characteristics, such as torque, rotational stop orientation and rotational detent orientation. At manufacture, hinge mounts coupled to the housing portions are populated by hinge cores that have rotational characteristics desired for the portable housing. At end of life, the hinge core is separated from the hinge mounts for reuse and/or recycling, and the hinge mounts are reused with a replacement hinge core. The hinge mounts couple to the housing portions with a wire bale and lever coupling device that supports automation both at initial assembly and at disassembly. In one embodiment, the hinge stop orientation is selectable, such as by removing a hinge stop mechanism from the hinge, so that the portable housing rotates by an additional amount that aids in system tear down, such as removal of a display and/or keyboard.

The present invention provides a number of important technical advantages. One example of an important technical advantage is that a portable housing rotationally couples hinge portions with a core that is selectable for hinge rotation characteristics, such as torque, stop orientation and detent orientation. At manufacture, a hinge core is selected based upon the weight of the system and desired hinge response. During use, the hinge core wears, such as by generating friction to provide a torque response, while the non-moving components, such as the mount, do not wear. At end of life, the hinge mounts are readily reused with replacement hinge cores while the hinge cores are broken down to use or recycle. Improved reuse and recycling of hinge components reduces costs and carbon footprint. Coupling the hinge mounts by the wire bundles supports automated system breakdown with minimal risk of damage to the system, which can occur when screws or rivets are removed. Disassembly is further simplified by selectively adjusting a rotation stop of the hinge to increase a rotational range of the hinge during disassembly and thereby improve access to components for tear down and removal, such as a display and keyboard that offer increased accessibility when the housing rotates a full 180 degrees versus a stop rotational orientation of 135 degrees.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 8A and 8B depict a side perspective view of a portable information handling system prepared for disassembly by release of a hinge stop.

DETAILED DESCRIPTION

An information handling system modular hinge adjusts rotational characteristics by selection of a hinge core with desired torque, stop and detent characteristics. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
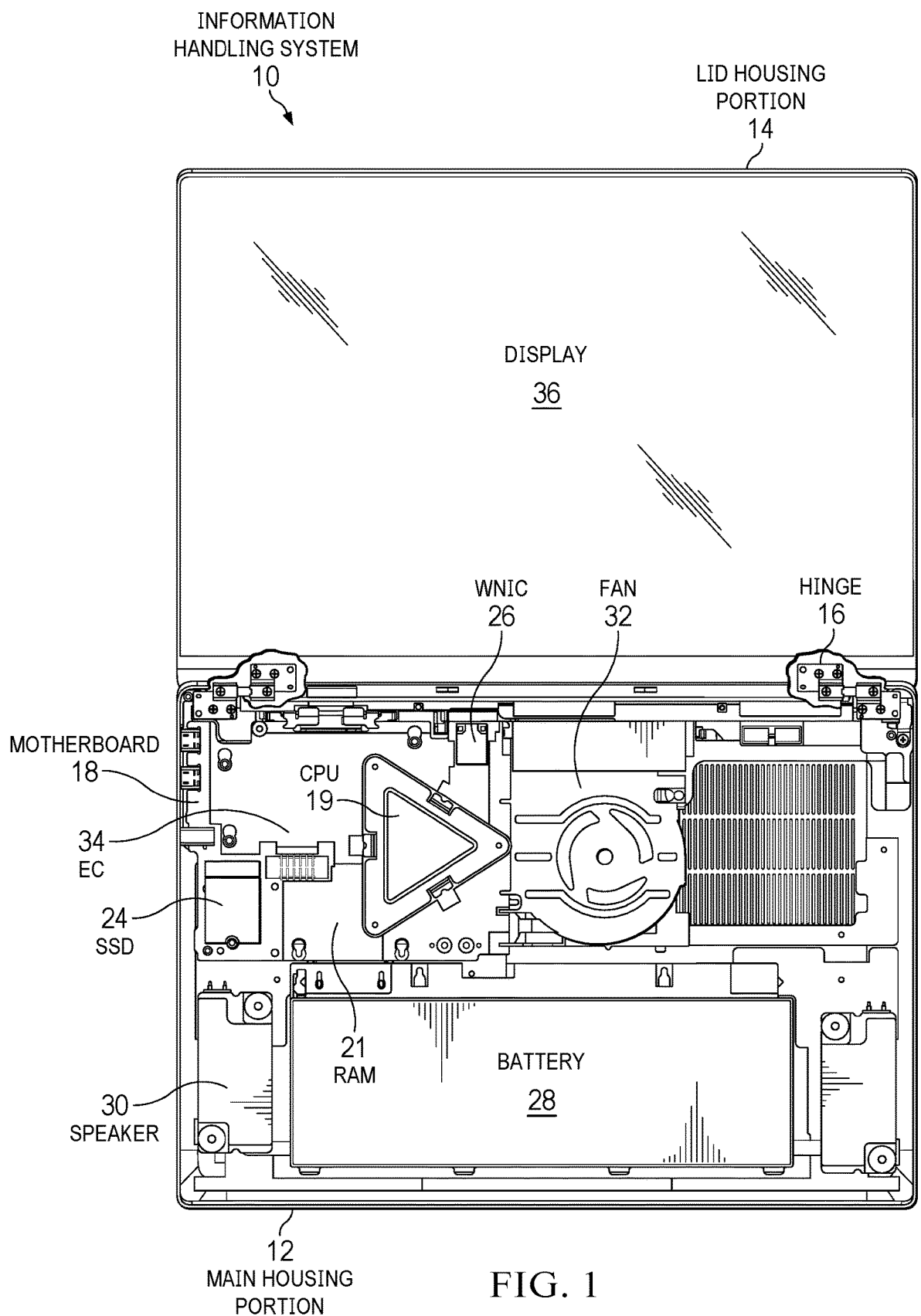
FIG. 1 depicts a portable information handling system that rotationally couples a main housing portion to a lid housing portion with a modular hinge having a core that determines hinge rotational characteristics, such as torque, detent orientation and rotational stop orientation.

Referring now to FIG. 1, a portable information handling system 10 is depicted that rotationally couples a main housing portion 12 to a lid housing portion 14 with a modular hinge 16 having a core that determines hinge rotational characteristics, such as torque, detent orientation and rotational stop orientation. Information handling system 10 processes information with processing components disposed in main housing portion 12 that communicate through wirelines of motherboard 18. In the example embodiment, a central processing unit (CPU) 19 executes instructions to process information in cooperation with a random access memory (RAM) 21 that stores the information and instructions. A solid state drive (SSD) 24 provides persistent storage during power down, such as with flash integrated circuits. A wireless network interface controller (WNIC) 26 provides wireless signal communications with peripheral devices and networks A battery 28 stores power to run the processing components when external power is not available. Speakers 30 generate audible sounds for audio information. A cooling fan 32 generates an active cooling airflow that cools the processing components. An embedded controller 34 has an associated flash memory and a processing resource that manages operating conditions within the system, such as application of power, internal thermal conditions and interactions with peripheral devices. Lid housing portion 14 rotationally couples to main housing portion 12 by a hinge 16 to rotate between open and closed positions. A display 36 couples to lid housing portion 14 and interfaces with motherboard 18 to present the information as visual images. As an example, portable information handling system 10 has the features described in U.S. patent application Ser. No. 18/081,061, entitled "Information Handling System Keyboard Support with Rail Guide Structure Assembly to a Housing Rail," by Morrison et al., filed on Dec. 14, 2022, and incorporated herein as if fully set forth.

In the example embodiment, hinge 16 includes a number of features that aid in the assembly, breakdown and reuse of information handling system 10. A modular design of hinge 16 separates each hinge into a fastening portion that couples to a portable housing and a rotational portion that wears over time due to rotation of the information handling system housing portions. The mounting fastening portions couple in a removeable fashion so that a hinge mount can be removed from a housing and reused in a different housing, such as with a wire bundle mounting arrangement. The rotational hinge core fits into the mount and includes a selectable set of characteristics that include torque, rotational detent orientation and rotational stop orientation. This arrangement allows any housing of any footprint to accept a common hinge mount and then configure with a selectable set of characteristics by selection of a hinge core. At end of life for an information handling system, a hinge mount is readily reused since the lack of moving parts reduces wear and the mount fits hinge cores with a wide variety of characteristics. The hinge core breaks down so that friction parts and rotating parts are readily replaced to reuse hinge core parts while worn parts are recycled. In addition, a hinge stop release within the hinge core is accessible from an exterior of an assembled information handling system housing so that the hinge fully rotates to support disassembly of the system, such as release of a display panel from the housing lid and release of a keyboard assembly from the housing main portion.

Figure 2:
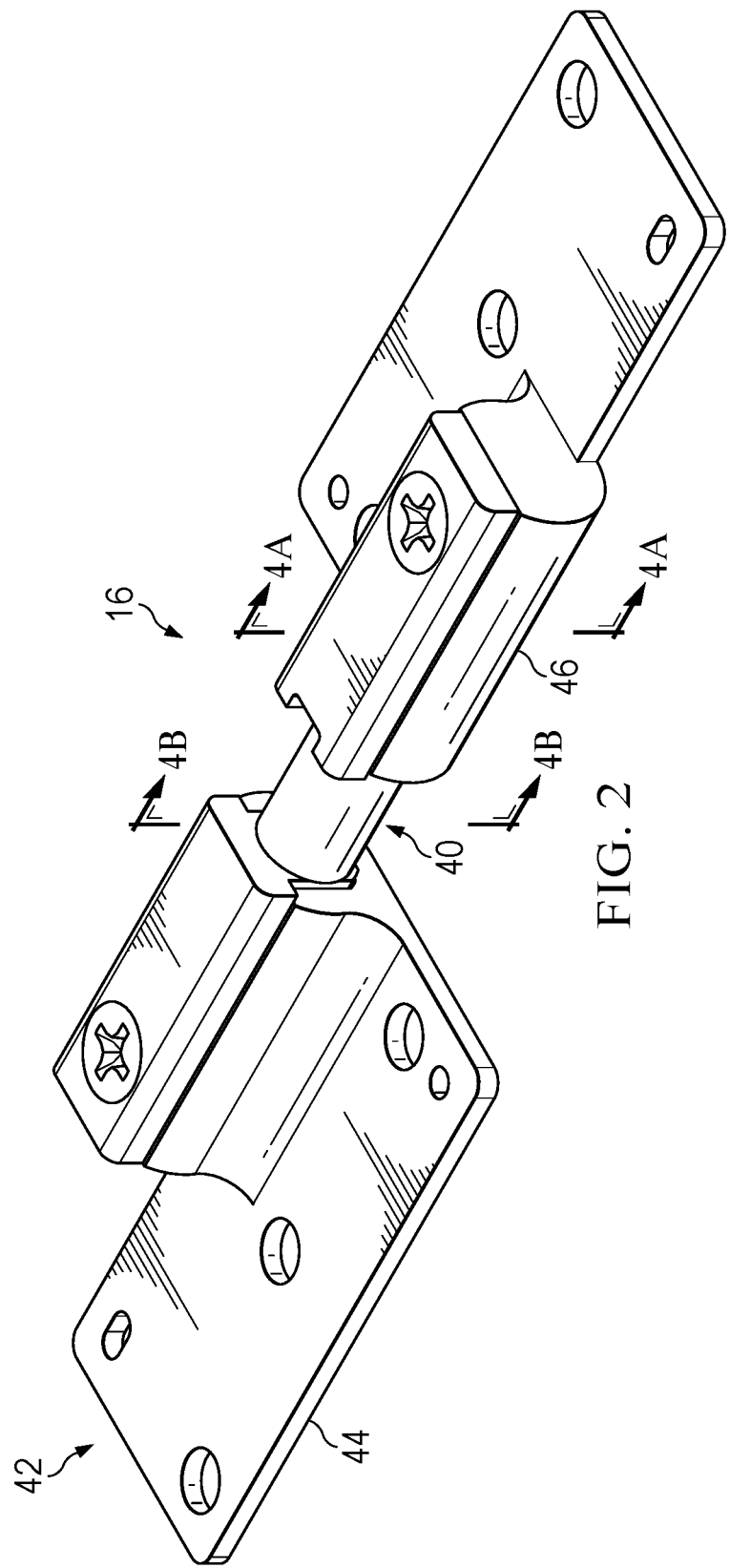
FIG. 2 depicts an upper perspective view of a modular hinge having selectable rotation characteristics by insertion of a hinge core to a hinge mount.

Referring now to FIG. 2, an upper perspective view depicts a modular hinge 16 having selectable rotation characteristics by insertion of a hinge core 40 to a hinge mount 42. Hinge mount 42 has a bracket portion 44 that couples to a housing portion, and a mount portion 46 that is configured to accept hinge core 40. Hinge 16 may be assembled as shown and then coupled to rotating housing portions. Alternatively, hinge mount 42 may be first coupled to each of opposing housing portions and then hinge core 40 is coupled in place by insertion into mount portion 46. In the example embodiment, bracket portion 44 has openings that accept screws coupled to a housing portion. At end of life, hinge 16 may be removed as a complete assembly with hinge core 40 coupled in place. Alternatively, hinge core 40 is released from mount 42 and removed from mount portion 46 so that the housing portions can be separated and reused with the hinge mounts remaining in place. If a housing portion has too much wear for reuse, hinge mounts 42 may also be removed and reused independent of the housing. Hinge mount 42 in the example embodiment lacks any moving parts so that rotation of the housing portions does not cause wear, thus allowing reuse of hinge mounts 42 for an extended time and across multiple platforms.

Figure 3:
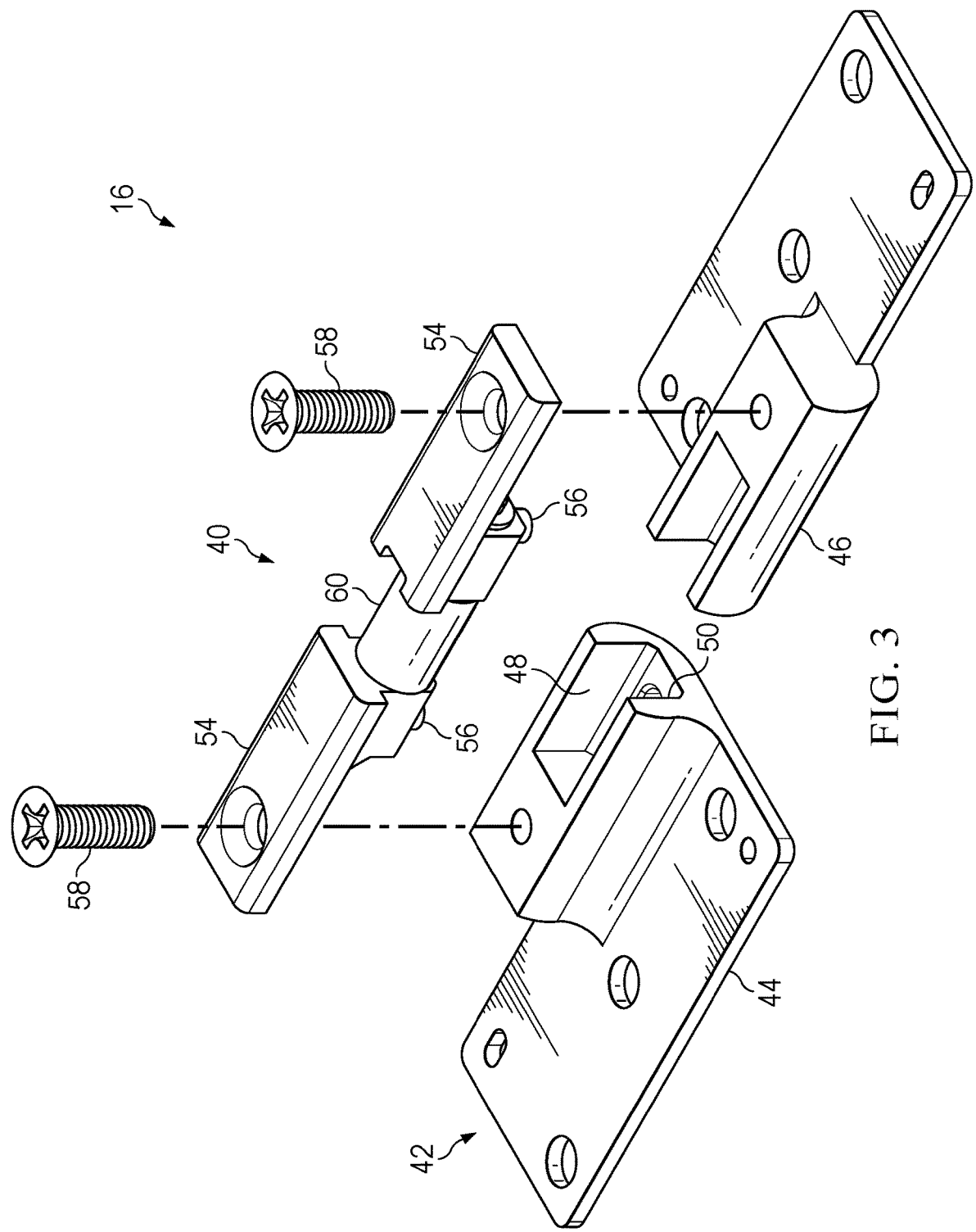
FIG. 3 depicts an exploded perspective view of a hinge with a hinge mount configured to accept a hinge core.

Referring now to FIG. 3, an exploded perspective view depicts a hinge 16 with a hinge mount 42 configured to accept a hinge core 40. In the example embodiment, hinge mount 42 has a bracket portion 44 and mount portion 46 stamped and/or machined from a steel piece to form a cavity 48 with a guide 50 configured to accept hinge core 40. Hinge core 40 has a central axle 52 that supports rotation relative to rotationally coupled mount adapters 54. Mount adapters 54 have a footprint on a bottom side configured to conform snuggly within mount cavity 48 and a pin 56 that extends down to insert into guide 50. The insertion of pin 56 into guide 50 and the conforming of the bottom surface of mount adapters 54 with cavity 48 securely hold hinge core 40 in a fixed place relative to hinge mount 42 to avoid wear at hinge mount 42. A flat mounting surface on the top side of mount portion 46 holds against a flat lower surface of mount adapter 54 to further support hinge core 40 removeably coupled in a separable manner at a fixed location. In the example embodiment, a screw 58 inserts through each mount adapter 54 to couple to threads formed in mount portion 46 of hinge mount 42 so that the planar bottom surface of mount adapter 54 presses downward against planar upper surface of mount portion 46.

Figure 4:
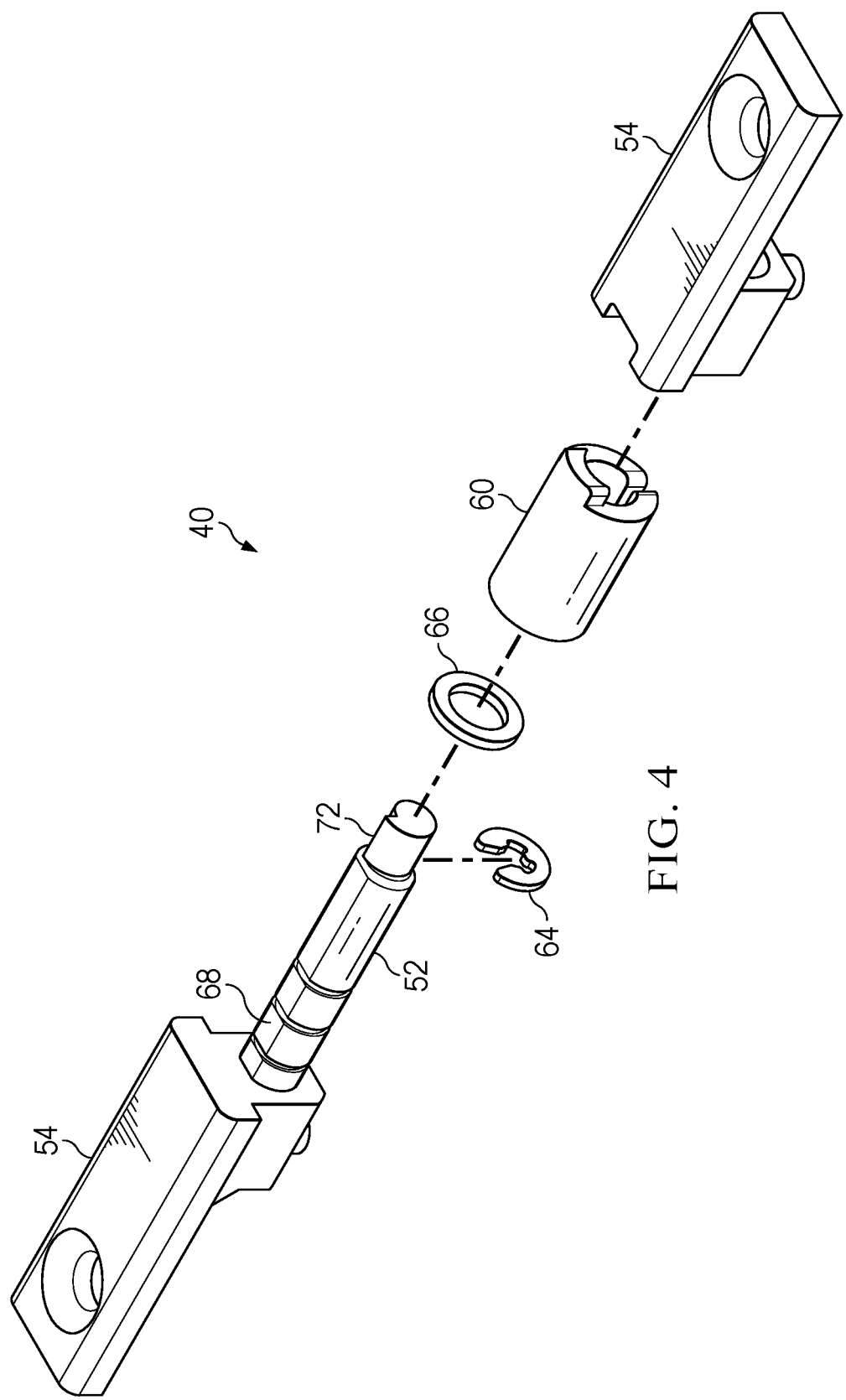
FIGS. 4, 4A and 4B depict an exploded side view of the hinge core configurable torque, stop and detent characteristics available to adapt a hinge to a desired rotation response for an information handling system rotationally coupled housing.
Figure 4A:
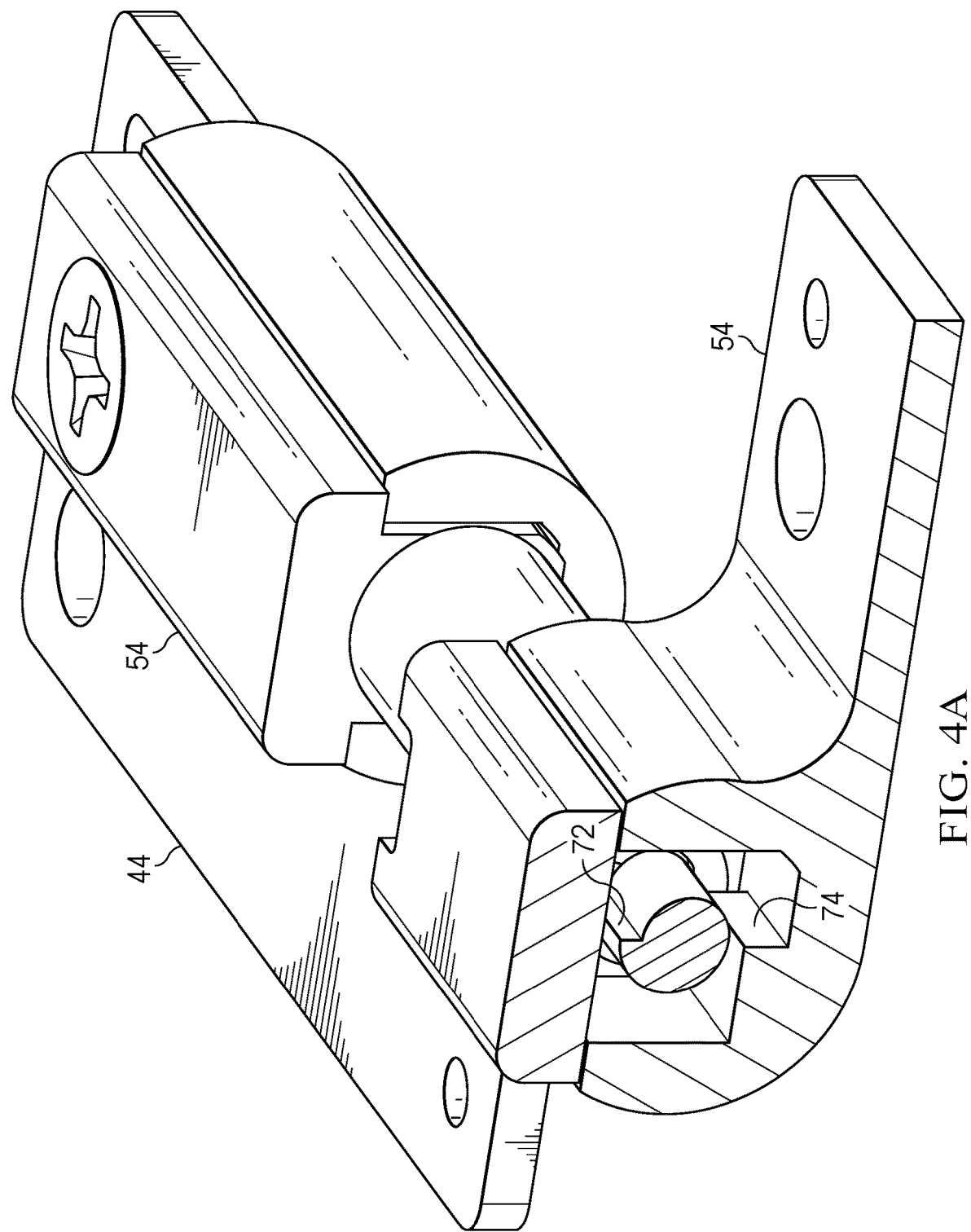
Figure 4B:
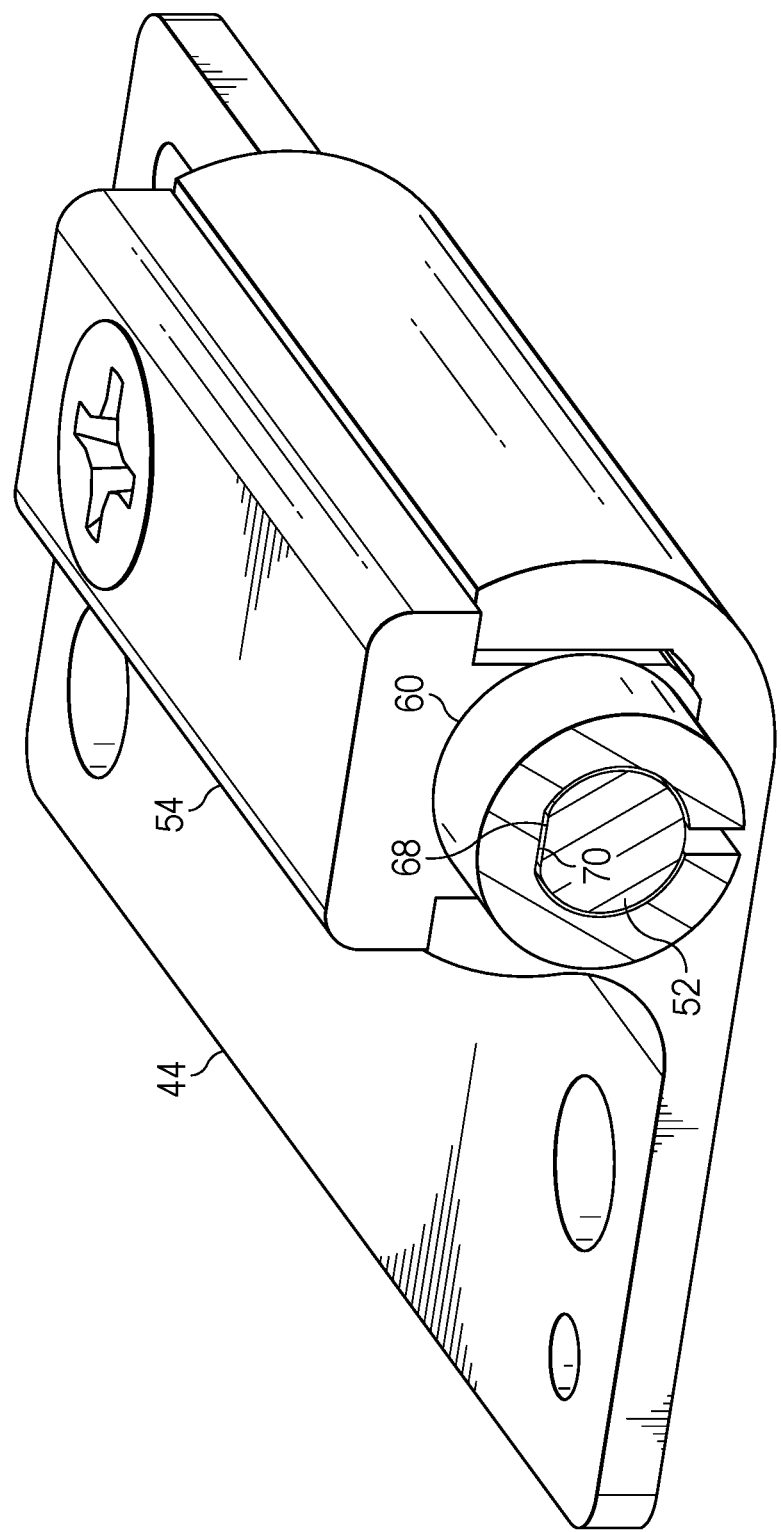

Referring now to FIGS. 4, 4A and 4B an exploded side view of hinge core 40 depicts configurable torque, stop and detent characteristics available to adapt a hinge to a desired rotation response for an information handling system rotationally coupled housing. In the example embodiment, mount adapter 54 rotationally couples to an axle 52 with a C-clip 64 that engages a slot of axle 52. Rotation of hinge core 40 may be provided by rotation of axle 52 within a stationary outer shield 60 that is pressed onto axle 52 to generate friction and thereby torque with rotation of axle 52 relative to shield 60. With this primary embodiment, detent rotational orientation is set by flats on the outer shield 60 relative to the inner axle 52, which cooperate to vary the amount of friction with increases at detent positions. In an alternative embodiment, the outer shield may rotate relative to a fixed inner axle 52 or with other arrangements for rotation of an axle to a fixed body that generates torque by frictional resistance against the axle. In one alternative embodiment, rotation relative to a fixed position of one or plural C-Clips 64 allows C-Clips 64 to generate torque that resists rotation. For instance, C-Clips 64 insert around inner axle 52 and are held in a fixed position relative to outer shield 60 so that rotation of axle 52 is resisted by friction from engagement against C-Clips 64. The amount of torque in this alternative arrangement is adjusted by the amount of pressure applied by C-Clips 64 and the number of C-Clips 64. For instance, hinge core 40 has an adjustable torque based upon the number of C-Clips 64 assembled in an outer shield 60 that holds the C-Clips in position. In addition, friction washers 66, such as Bellville washers, couple to the rotating portion of axle 52 to provide torque that resists hinge rotation. In various embodiments, C-Clips 64 and friction washers 66 may be used individually or in combination to achieve a desired torque profile.

Hinge core 40 is also configurable for desired stop orientations and detent orientations. In the example embodiment of FIG. 4B, a detent 68 is included on inner axle 52 that interacts with a detent feature 70 of outer shield 60 or in an alternative embodiment mount adapter 54 where axle 52 couples to rotate. In order to generate a detent effect, such as click feel at defined rotational orientations, the detents are established by flats on the axle and/or outer shield and a spacing in the outer shield that changes to adjust compression and thus friction based upon the position of the flat. Similarly, FIG. 4A depicts a stop 72 of axle 52 interacts with a stop feature 74 of mount adapter 54 to define a stop in rotation of hinge core 40, such as to define a maximum amount of rotation of a lid housing portion to an open position. Alternatively, the stop feature may be formed in outer shield 60, which remains stationary relative to mount adapter 54. Although each hinge core 40 can have defined detent and stop characteristics, the same components may be used to assemble the hinge cores with the different detent and stop characteristics by changing the orientation at which axle 52 aligns when coupled to mount adapter 54. At an information handling system end of life, the parts within hinge core 40 that have not been subject to wear can be reused for remanufactured hinge cores. Although the example embodiment offers a variety of different assemblies to accomplish the hinge core, other arrangements may be used that fit within the footprint of the hinge mounts to accomplish the desired torque, stop and detent characteristics.

Figure 5:
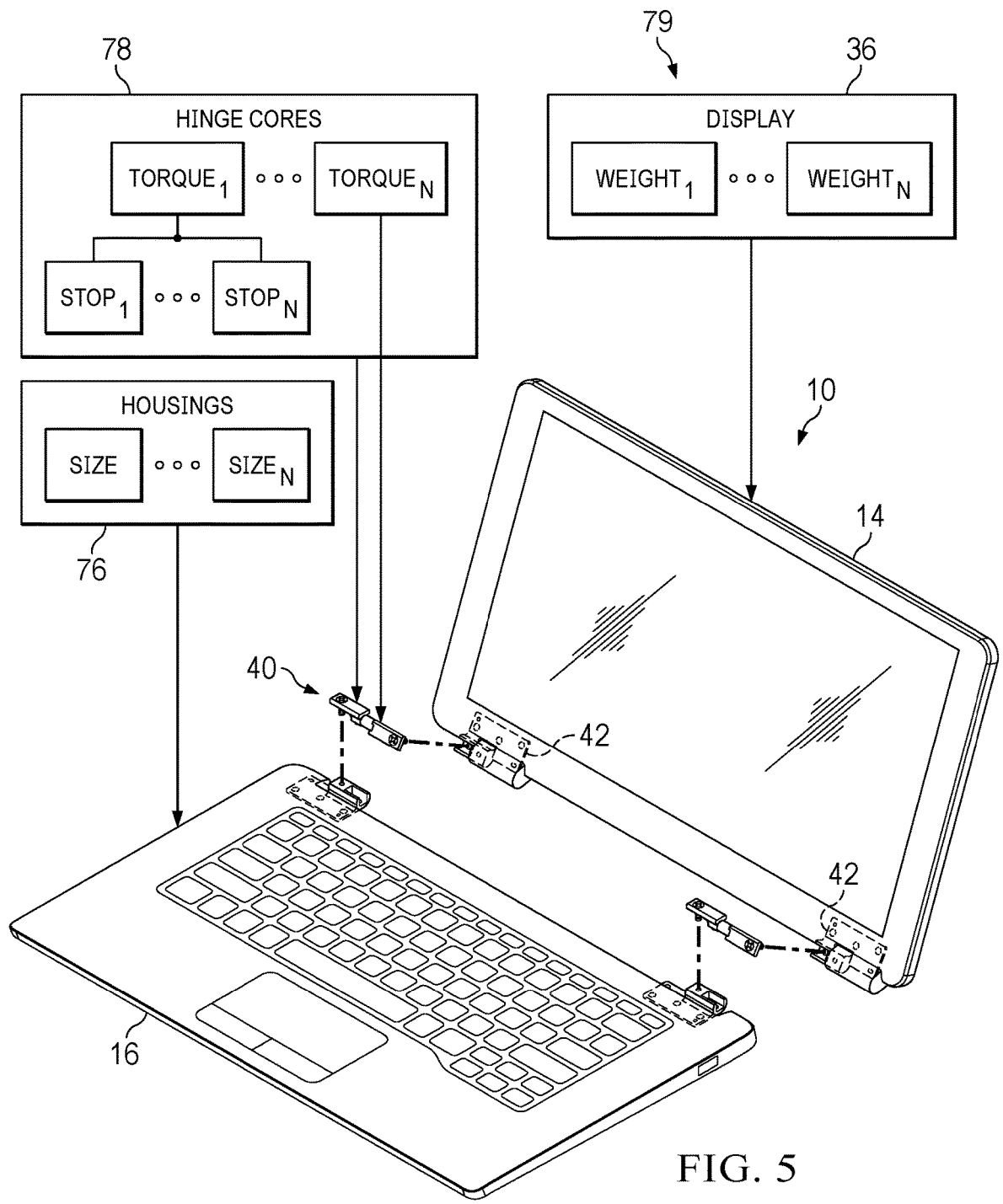
FIG. 5 depicts a flow diagram of a process for selection of a hinge core to install in an information handling system housing to achieve desired housing rotation characteristics.

Referring now to FIG. 5, a flow diagram depicts a process for selection of a hinge core to install in an information handling system housing to achieve desired housing rotation characteristics. The process starts at step 76 with a selection of housing sizes 1 through n, step 78 with a selection of hinge cores having a torque 1 through n, and step 79 with a selection of displays 36 of weight 1 through n. The selection of the hinge core for a given housing is determined based upon the weight of the display in the housing, the weight of the main and lid housing portions and the desired hinge rotation response. Once the hinge core is selected for torque, the process continues if desired to further define hinge core characteristics, such as with a stop selected from stop orientation values 1 through n. The selected hinge core 40 is then assembled to the hinge mounts 42 coupled to lid housing portion 14 and main housing portion 16. Manufacture of information handling system 10 is managed in a flexible and adaptive manner by selecting from an inventory of hinge cores to build a system having desired housing rotation characteristics.

Figure 6:
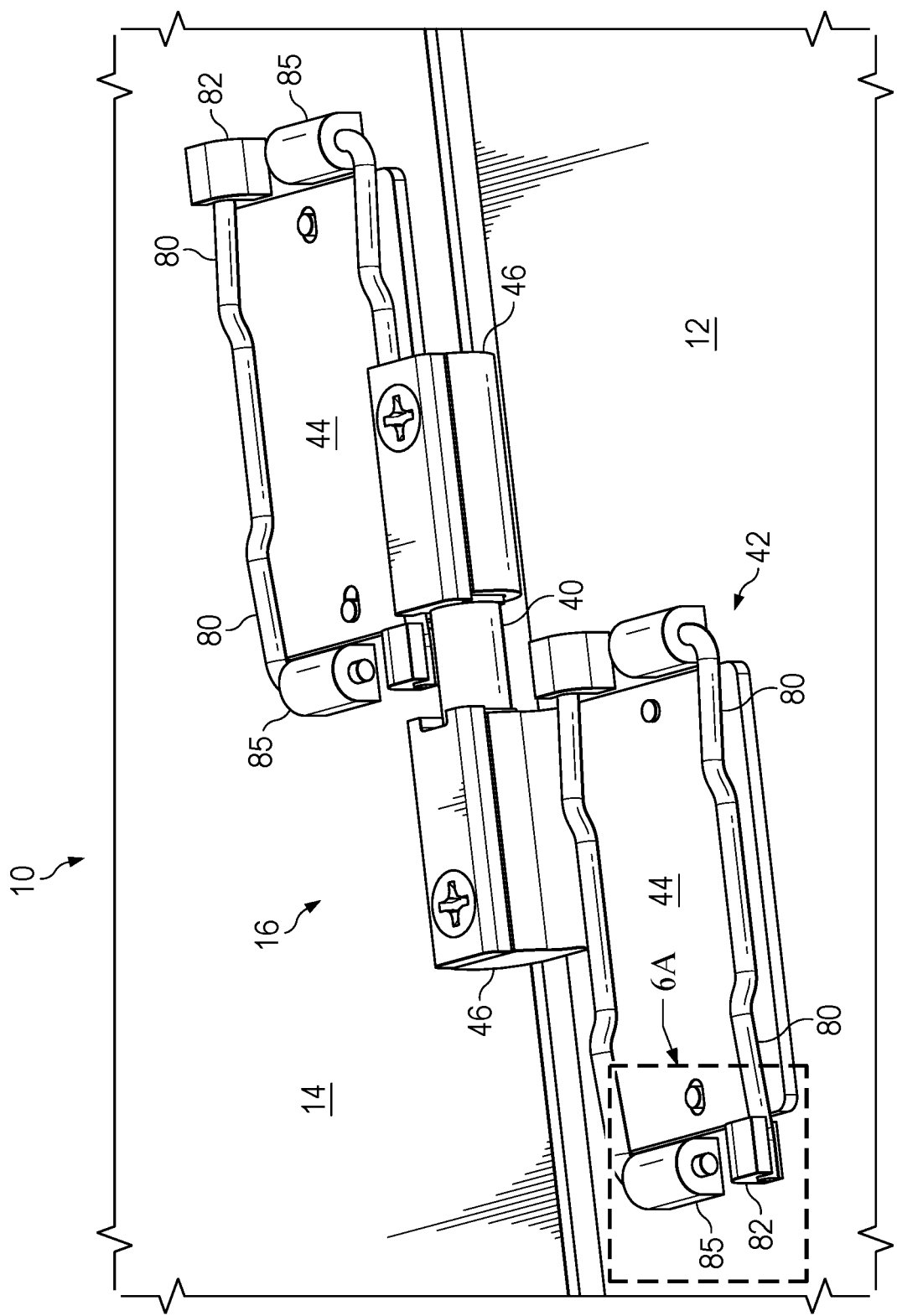
FIGS. 6 and 6A depicts an upper perspective detailed view of an information handling system housing having a modular hinge coupled to the housing by wire bundles and lever couplers.
Figure 6A:
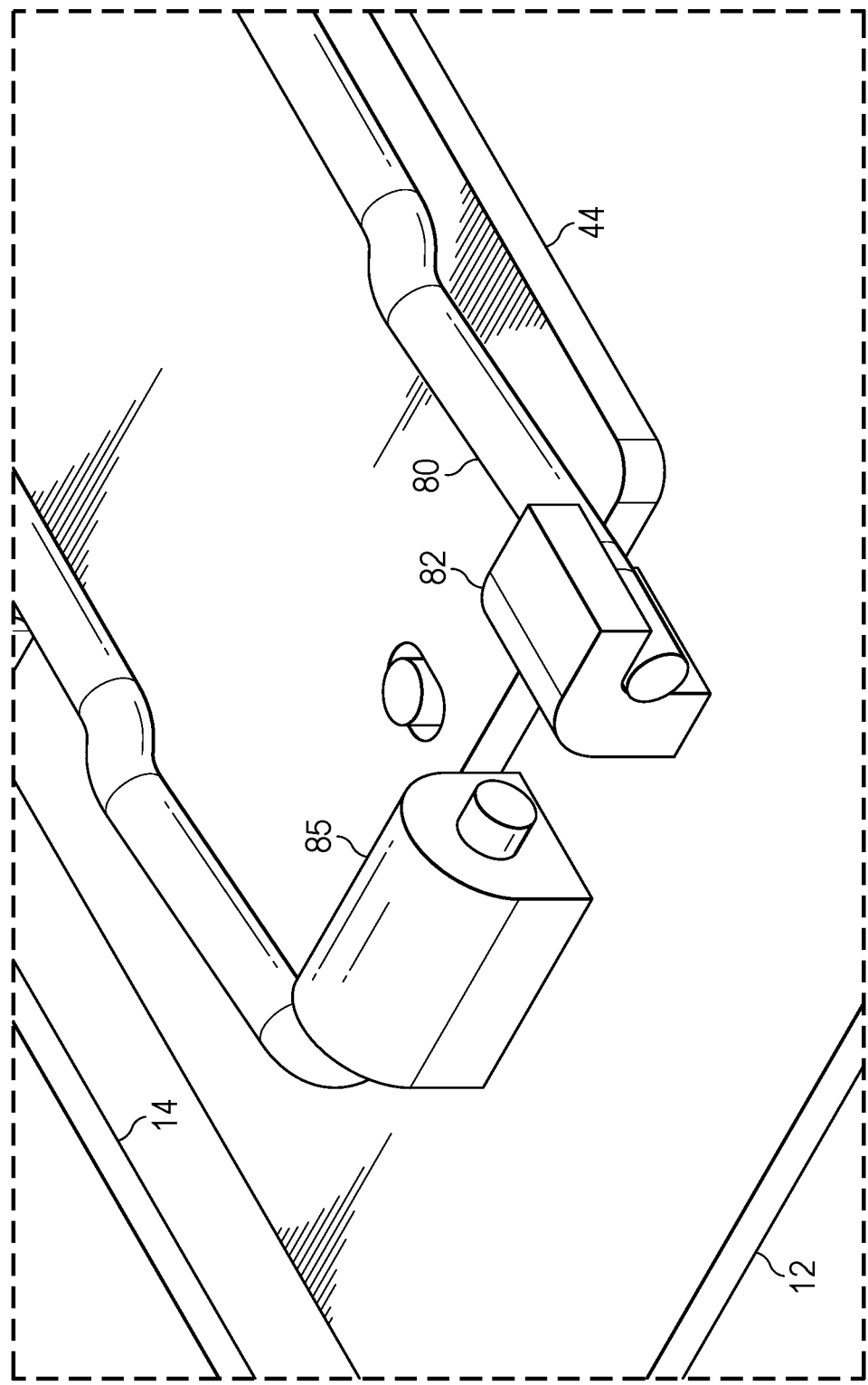

Referring now to FIGS. 6 and 6A, an upper perspective detailed view of an information handling system 10 housing depicts a modular hinge 16 coupled to the housing by wire bundles and lever couplers. A hinge mount 42 bracket portion 44 couples to each of the lid housing portion 14 and main housing portion 12 so that a hinge core 40 rotationally couples the housing portions at mount portions 46. Each bracket portion 44 includes openings that accept fasteners, such as screw or rivets, that are used in conventional assemblies to couple a hinge to a housing. The difficulty with such conventional fastening arrangements is that disassembly of the hinge from the housing becomes inefficient and tends to damage the hinge components. In order to improve harvesting of hinges and hinge components for reuse and/or remanufacture, rotationally coupled wire bails 80 engage hinge mount 42 with tool-less lever coupling devices 82. In the example embodiment, opposing wire bales 80 tie down each hinge mount 42 to the system housing with a parallel placement to the rotational axis of hinge 16. For example, the wire bales are stainless steel or nickel titanium wire that retain a resilient and straight form. Loading and deflection of wire bails 80 hold mount brackets 44 tight against the housing base to secure hinge 16 in place with a press down of lever coupling device 82 that is accessible to automated and/or robotic assembly and disassembly. The coupling arrangement of the wire bale prevents free play due to tolerances in the components that meets requirements for secure attachment typically provided by screws and other conventional attachment arrangements. FIG. 6A depicts a detailed view of coupling device 82 where wire bale 80 couples into a latch area 85 so that a downward bending force of the wire against the hinge mount secures the hinge mount to the housing. Latch area 85 accepts wire bale 80 with deflection that snaps the wire bale into the latch area and applies a deflection force downward on the hinge mount based on the vertical height of the latch. In the example embodiment, latch area 85 accepts wire bale 82 with insertion parallel to the hinge rotational axis. Wire bale 80 has a 90 degree bend where it couples to a latch area that provides a rotational axis of the wire bale perpendicular to the rotational axis of the hinge.

Figure 7:
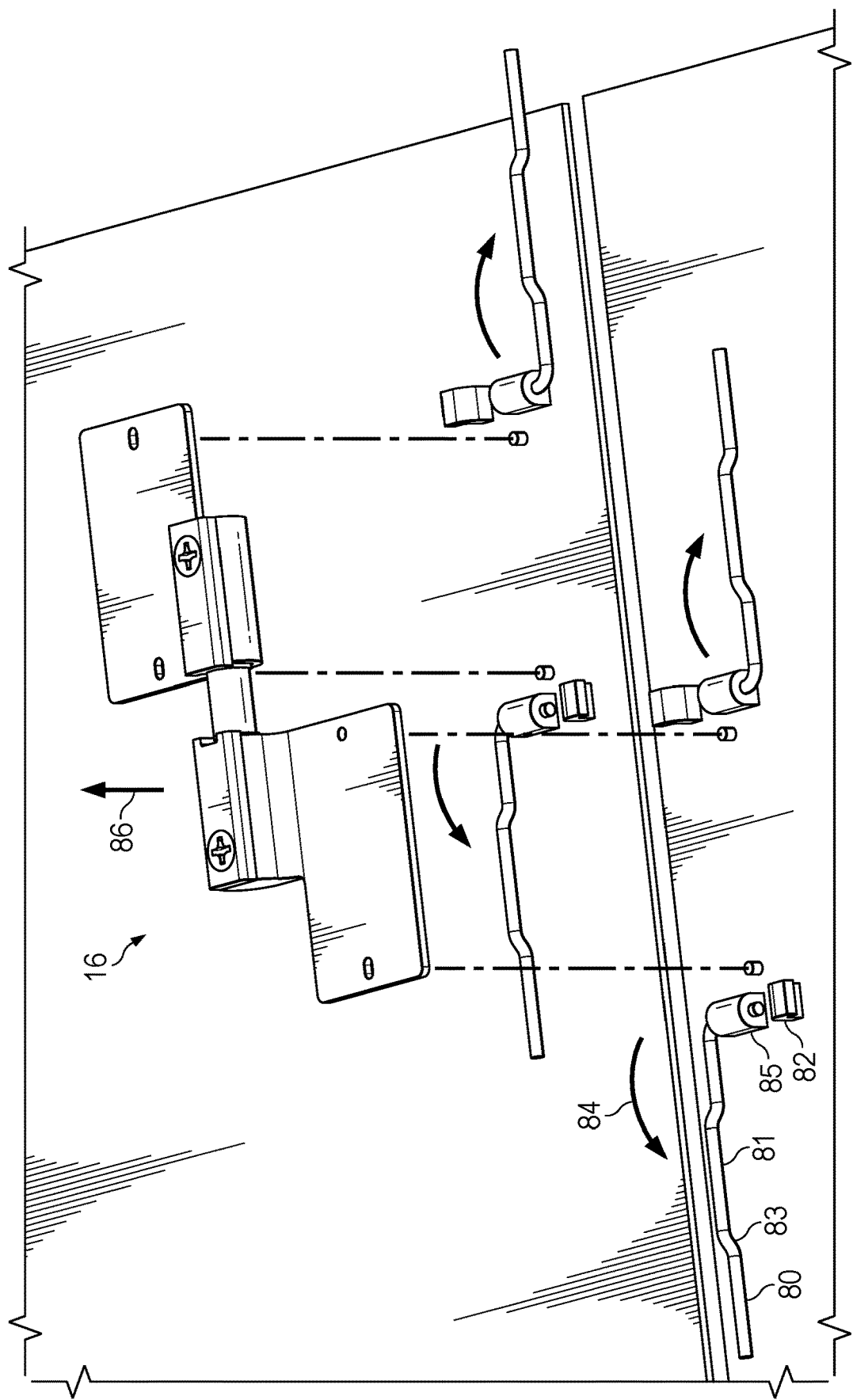
FIG. 7 depicts an upper perspective detailed view of an information handling system housing having a modular hinge released from the housing wire bundles and lever couplers.

Referring now to FIG. 7, an upper perspective detailed view depicts an information handling system housing having a modular hinge 16 released from the housing wire bales 80 and lever coupling device 82. In the example embodiment, wire bales 80 has stiff wire portions 81 coupled to each other by hinged portions 83 to form a central offset region. One end of each wire bale 80 terminates parallel to the rotational axis of hinge 16 while the opposing end terminates perpendicular to the rotational axis. When the end of wire bale 80 that is parallel to the hinge rotation axis is released from lever coupling device 82, wire bale 80 rotates as indicated by arrows 84 to release hinge 16 for removal from the housing as indicated by arrow 86. The central stiff wire portion 81 when rotated to secure the hinge mount fits under the hinge mount so that the outer portions of wire bale 80 leverages down on the upper side of the hinge mount. Lever coupling device 82 latches and unlatches around wire bale 80 in a manner similar to an independent load mechanism (ILM) bracket that holds a processor in a socket or a thermal solution over a processor. Hinged portions 83 support rotation of the wire bale 80 so that hinge 16 can fit the openings of the hinge mount at different orientations of rotation of the wire bale 80 about the coupling device 82. The result is a flexible system for quick assembly of a hinge and housing in a secure manner. Although the example embodiment depicts assembly of a modular hinge 16, the wire bale and lever coupling device arrangement may also be used to couple conventional hinges to an information handling system housing.

Figure 8B:
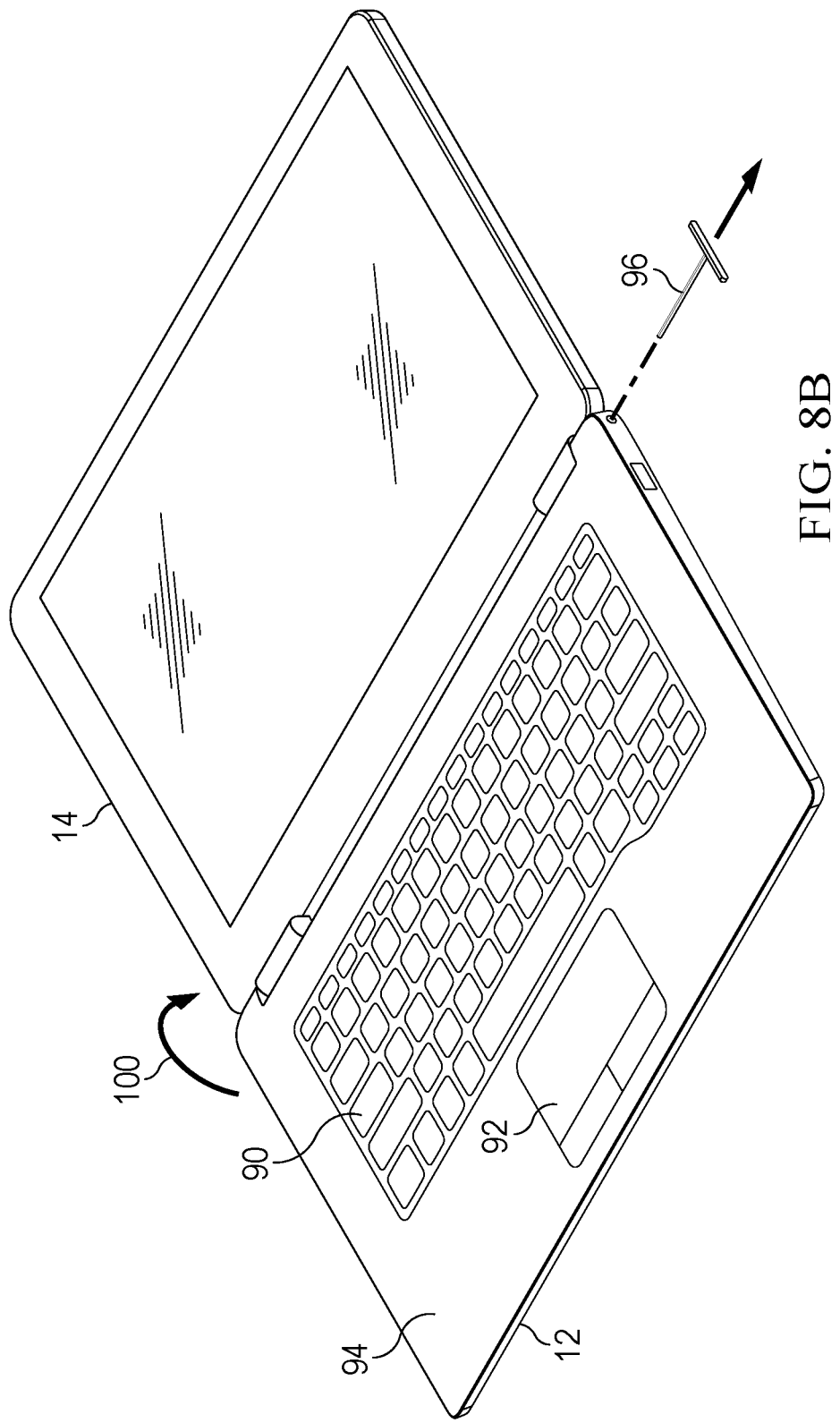

Referring now to FIGS. 8A and 8B, a side perspective view depicts a portable information handling system 10 prepared for disassembly by release of a hinge stop. FIG. 8A depicts portable information handling system 10 in a full open position with the main housing portion 12 rotated about a hinge relative to lid housing portion 14 until a stop of the hinge prevents further rotation. In the open position, an end user can view display 36 while a housing cover 94 supports a keyboard 90 and touchpad 92 in a position to accept end user inputs. In the example embodiment, the hinge stop prevents rotation of lid housing portion 14 relative to main housing portion 12 by greater than 135 degrees. At the full rotation of 135 degrees, display 36 and/or keyboard 90 are secured to information handling system 10 due to inaccessibility for removal by the interaction of the housing portions with each other. In order to support disassembly of information handling system 10, a hinge key 96 fits through an opening of the housing to engage the hinge and rotate as indicated by arrow 98 to release the hinge stop. For example, hinge key 96 fits through a security device opening when a securing cable is removed, such as a Kensington lock. In the example embodiment, the hinge has only one stop on one side of the housing that stops rotation at 135 degrees. In an alternative embodiment, a hinge stop may be included on each side of the housing.

FIG. 8B depicts information handling system 10 with lid housing portion 14 rotated 180 degrees relative to main housing portion 12 after release of the hinge stop by hinge key 96. When the housing is free to rotate past the 135 degree hinge stop to a fully open position with 180 degrees of rotation as indicated by arrow 100, access is provided to the bottom side of lid housing portion 14 to release display 36 for disassembly while the hinge itself remains in place to rotationally couple the lid and main housing portions. Similarly, the rear side of main housing portion 12 is accessible to release housing cover 94 and remove keyboard 90. Once a repair is completed and a new display and/or keyboard is coupled in place, the housing is returned to 135 degrees of rotation so that hinge key 96 can reinsert into the opening and reinstall the hinge stop, thereby securing the housing with the hinge stop limiting rotation to 135 degrees at which access to the display and/or keyboard is protected.

Figure 9A:
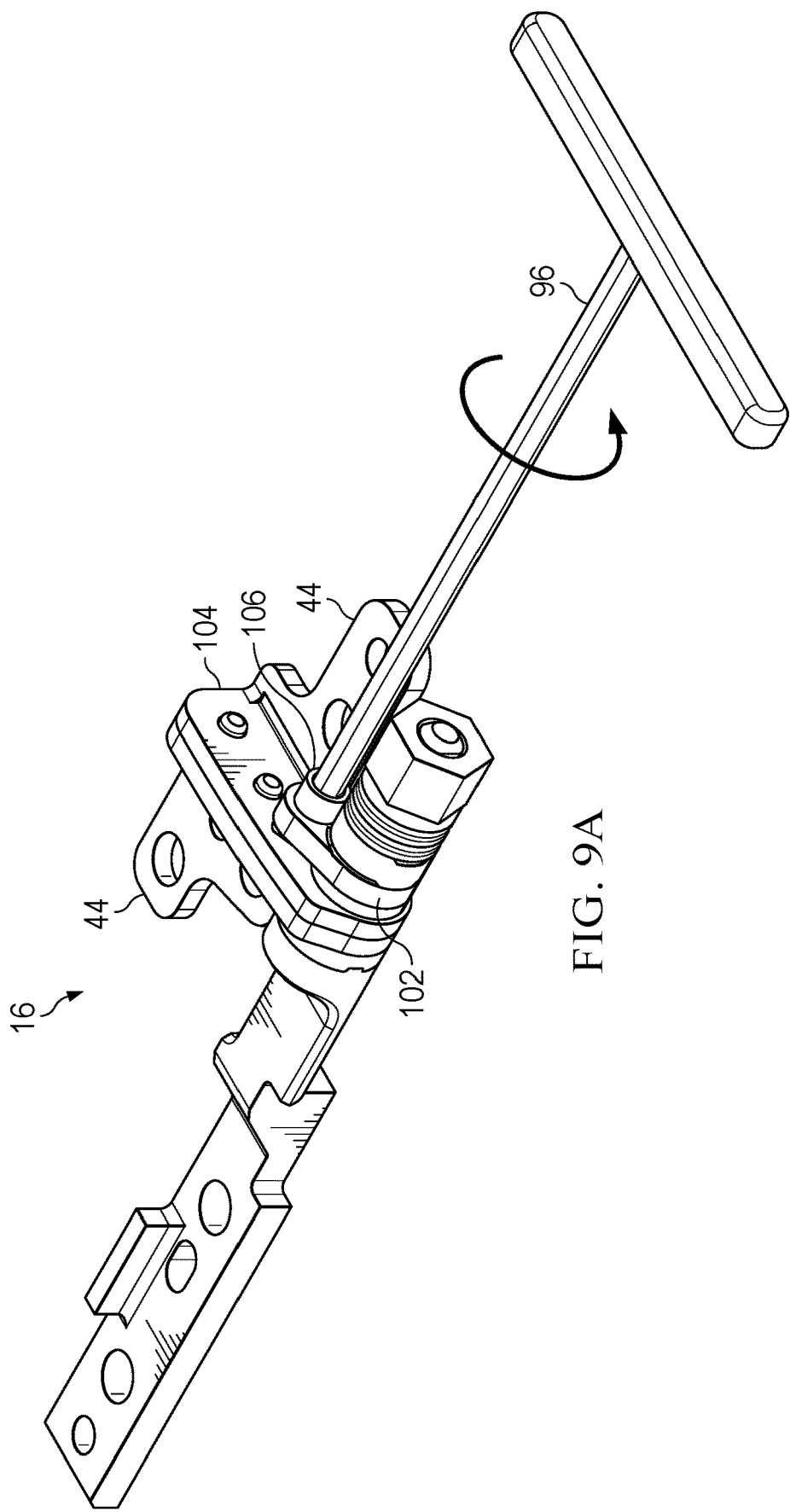
FIGS. 9A, 9B and 9C depict an example hinge interaction that removes a rotational stop to support an information handling system breakdown, such as removal of a display panel or keyboard.
Figure 9B:
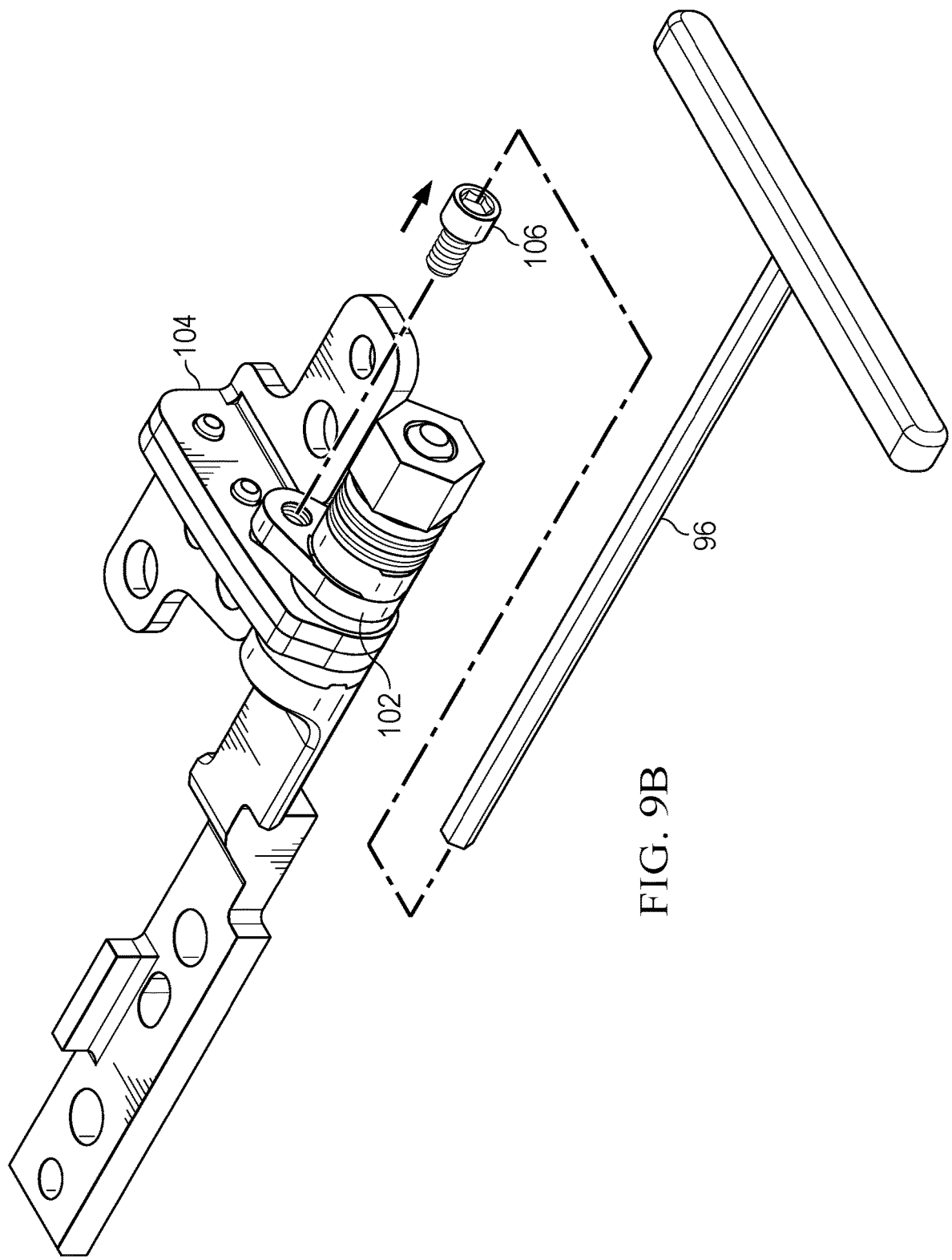
Figure 9C:
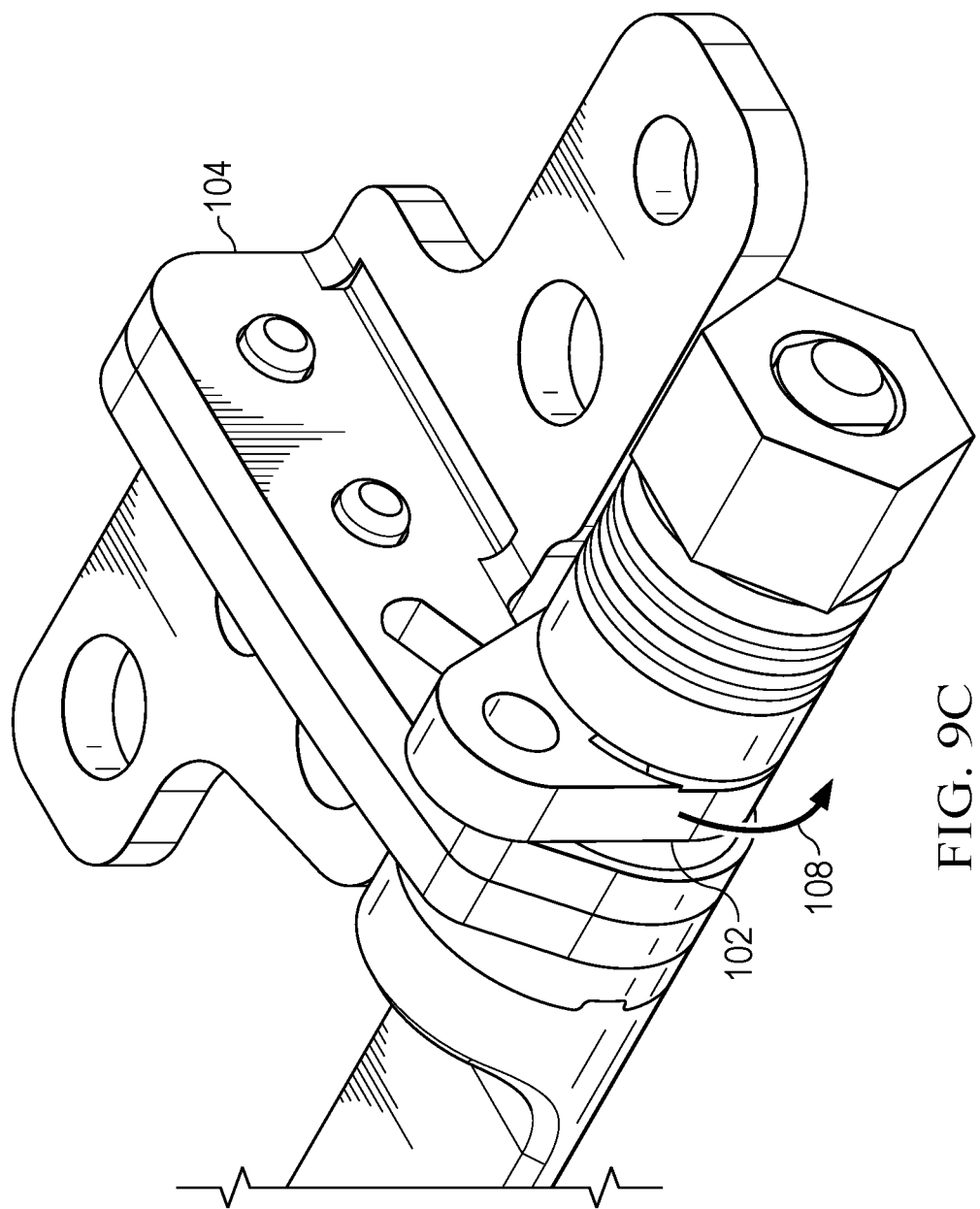

Referring now to FIGS. 9A, 9B and 9C, an example hinge 16 interaction depicts removal of a rotational stop to support an information handling system breakdown, such as removal of a display panel or keyboard. In the example embodiment, hinge 16 couples to a lid housing portion with a bracket 44 having a stop assembly 104 that couples to the hinge torque engine 102 with a screw 106. When screw 106 couples torque engine 102 to stop assembly 104, rotation of hinge 16 is limited to 135 degrees by interference of torque engine 102 with stop assembly 104. FIG. 9A depicts hinge key 96 inserted to engage with screw 106, which releases with a left twist. Although FIG. 9B depicts release of the stop assembly 104 from torque engine 102 by removal of screw 106, in alternative embodiments, the screw releases the stop assembly while remaining coupled in place for more ready reassembly. FIG. 9C depicts hinge 16 after release of the stop assembly having free rotation as indicated by arrow 108. For example, with the stop assembly released from the torque engine, the housing rotates a full 180 degrees so that the display can be accessed for removal. Although the example embodiment removes a screw to release the stop, in other embodiments other types of coupling devices may be used to couple and release the stop. Although the example embodiment depicts a conventional hinge, the stop assembly release may also be included in the modular hinge and hinge core described above.

Although the present invention has been described in detail, it should be understood that various changes, substitutions and alterations can be made hereto without departing from the spirit and scope of the invention as defined by the appended claims.

What is claimed is:

1. An information handling system comprising:
a housing having a lid portion and a main portion;
a processor disposed in the housing and operable to execute instructions to process information;
a memory disposed in the housing and interfaced with the processor, the memory operable to store the instructions and information;
a display couple in the lid portion and interfaced with the processor to present the information as visual images; and
a hinge coupled to the lid portion and the main portion to rotate the lid portion and main portion between open and closed positions, the hinge having a stop that limits hinge rotation to between a closed position and an open position having a predetermined rotational orientation, the stop accessible through the housing for release, the hinge rotating past the predetermined rotational orientation when the stop is released.

2. The information handling system of claim 1 wherein the hinge further comprises:
a torque engine;
a bracket; and
a screw coupling the torque engine and bracket, the screw releasing to uncouple the torque engine and bracket to allow the rotating past the predetermined rotational orientation.

3. The information handling system of claim 1 further comprising:
a screw engaged with the hinge to establish the stop at the predetermined rotational orientation; and
a tool configured to insert through the housing and disengage the screw to release the stop.

4. The information handling system of claim 1 wherein:
the predetermined rotational orientation is 135 degrees; and
the hinge rotates at least 180 degrees when released.

5. The information handling system of claim 1 wherein:
the display is captured at least in part by the housing when the housing rotational orientation is between closed and the predetermined rotational orientation; and
the display is released from capture by the housing when the rotational orientation exceeds the predetermined rotational orientation.

6. The information handling system of claim 1 further comprising a keyboard wherein:
the keyboard is captured at least in part by the housing when the housing rotational orientation is between closed and the predetermined rotational orientation; and
the keyboard is released from capture by the housing when the rotational orientation exceeds the predetermined rotational orientation.

7. The information handling system of claim 1 wherein the hinge further comprises:
a first mount coupled to the main housing portion;
a second mount coupled to the lid housing portion; and
a selectively separable core removably coupled to the first and second mounts, the core having a rotatable axle and a torque device coupled to the rotatable axle to resist rotation of the axle.

8. The information handling system of claim 1 further comprising:
a first selectively separable core having a first torque; and
a second selectively separable core having a second torque different from the first torque;
wherein one of the first and second selectively separable cores are selected to couple to the first and second mounts to achieve a predetermined housing rotation characteristic.

9. The information handling system of claim 8 further comprising a wire bale coupled to the housing and overlapping the hinge to couple the hinge to the housing.

10. A method for disassembly of an information handling system, the method comprising:
rotating the information handling system housing between a closed position and an open position of a predetermined rotational orientation defined by a hinge stop;
releasing the hinge stop; and
in response to releasing the hinge stop, rotating the housing past the predetermined rotational orientation.

11. The method of claim 10 further comprising:
engaging a display in the housing when the housing rotational orientation is between closed and the predetermined rotational orientation; and
releasing the display from the housing when the housing rotational orientation is greater than the predetermined rotational orientation.

12. The method of claim 10 further comprising:
engaging a keyboard in the housing when the housing rotational orientation is between closed and the predetermined rotational orientation; and
releasing the keyboard from the housing when the housing rotational orientation is greater than the predetermined rotational orientation.

13. The method of claim 10 wherein the releasing the hinge stop further comprises:
inserting a tool through an opening of the housing and into the housing interior; and
unscrewing a screw with the tool to release the stop.

14. The method of claim 13 wherein the opening accepts a locking device, the screw inaccessible through the opening when the locking device couples to the housing.

15. The method of claim 13 further comprising:
coupling a stop assembly to a torque engine with the screw; and
releasing the hinge from the torque engine when the screw is unscrewed.

16. The method of claim 10 wherein the predetermined orientation is 135 degrees of rotation from the closed position.

17. A hinge comprising:
a first mount configured to couple to an information handling system main portion;
a second mount configured to couple to the information handling system lid portion;
a core removably coupled to the first and second mounts, the core having a rotatable axle to rotate relative to the first mount and the second mount; and
a stop that limits core rotation to between a closed position and an open position having a predetermined rotational orientation, the stop accessible from exterior the hinge for release, the hinge rotating past the predetermined rotational orientation when the stop is released.

18. The hinge of claim 17 wherein the stop comprises:
a torque engine;
a bracket; and
a screw coupling the torque engine and bracket, the screw releasing to uncouple the torque engine and bracket to allow the rotating past the predetermined rotational orientation.

19. The hinge of claim 18 wherein:
the predetermined rotational orientation is 135 degrees; and
the hinge rotates at least 180 degrees when released.

20. The hinge of claim 17 further comprising:
a housing having a first housing portion coupled to the first mount and a second housing portion coupled to the second mount; and
a display captured at least in part by the housing when the housing rotational orientation is between closed and the predetermined rotational orientation, the display released from capture by the housing when the rotational orientation exceeds the predetermined rotational orientation.

* * * * *